(12) United States Patent
Nishi et al.

(10) Patent No.: US 11,697,304 B2
(45) Date of Patent: Jul. 11, 2023

(54) VEHICLE WHEEL DISC AND VEHICLE DISC WHEEL

(71) Applicant: RING TECHS CO., LTD., Okayama (JP)

(72) Inventors: Takayuki Nishi, Okayama (JP); Eijiro Sugimoto, Okayama (JP)

(73) Assignee: RING TECHS CO., LTD., Okayama (JP)

( * ) Notice: Subject to any disclaimer, the term of this patent is extended or adjusted under 35 U.S.C. 154(b) by 541 days.

(21) Appl. No.: 16/650,062

(22) PCT Filed: Sep. 28, 2018

(86) PCT No.: PCT/JP2018/036174
§ 371 (c)(1),
(2) Date: Mar. 24, 2020

(87) PCT Pub. No.: WO2019/065935
PCT Pub. Date: Apr. 4, 2019

(65) Prior Publication Data
US 2020/0290397 A1    Sep. 17, 2020

(30) Foreign Application Priority Data

Sep. 28, 2017  (JP) .................................. 2017-188348

(51) Int. Cl.
*B60B 3/00* (2006.01)
*B60B 3/12* (2006.01)
(Continued)

(52) U.S. Cl.
CPC .............. *B60B 3/008* (2013.01); *B60B 3/004* (2013.01); *B60B 3/04* (2013.01); *B60B 3/12* (2013.01);
(Continued)

(58) Field of Classification Search
CPC ........... B60B 3/004; B60B 3/008; B60B 3/04; B60B 3/12; B60B 3/16
See application file for complete search history.

(56) References Cited

U.S. PATENT DOCUMENTS

| | | | |
|---|---|---|---|
| 3,788,705 A * | 1/1974 | Brainard | B60B 3/04 301/35.626 |
| 4,181,364 A * | 1/1980 | Reppert | B60B 3/12 301/63.109 |

(Continued)

FOREIGN PATENT DOCUMENTS

| | | |
|---|---|---|
| DE | 102006009884 | 9/2007 |
| JP | 09-132002 | 5/1997 |

(Continued)

*Primary Examiner* — Jason R Bellinger
(74) *Attorney, Agent, or Firm* — Clark & Brody LP (57) ABSTRACT

A mounting portion of a disc includes a flat plate portion having a pressing surface to be pressed against a hub of an axle, and a plurality of nut support portions protruding from the flat plate portion to a side opposite to the pressing surface in an axial direction of the disc, and having an annular shape as viewed from the axial direction. A bolt hole is provided to penetrate the nut support portion in the axial direction. The nut support portion includes a bulging portion curving to bulge outward in a radial direction of the nut support portion, and a protruding portion disposed adjacent to the bulging portion in a circumferential direction of the nut support portion, and protruding inward in the radial direction of the nut support portion with respect to the bulging portion.

8 Claims, 5 Drawing Sheets

(51) Int. Cl.
*B60B 3/04* (2006.01)
*B60B 3/16* (2006.01)

(52) U.S. Cl.
CPC .......... *B60B 3/16* (2013.01); *B60B 2310/302* (2013.01); *B60B 2360/145* (2013.01); *B60B 2900/311* (2013.01)

(56) References Cited

U.S. PATENT DOCUMENTS

| | | | | |
|---|---|---|---|---|
| 6,997,519 | B2* | 2/2006 | Fischbacher | B60B 3/008 301/35.626 |
| 7,464,995 | B2* | 12/2008 | Csapo | B60B 3/007 301/35.626 |
| 7,469,973 | B2* | 12/2008 | Coleman | B60B 3/12 301/35.626 |
| 2006/0152067 | A1* | 7/2006 | Corte | B60B 3/008 301/35.631 |
| 2009/0096276 | A1 | 4/2009 | Orey et al. | |
| 2011/0193405 | A1 | 8/2011 | Kihara et al. | |

FOREIGN PATENT DOCUMENTS

| | | |
|---|---|---|
| JP | 10-513414 | 12/1998 |
| JP | 2009-096467 | 5/2009 |
| JP | 2010-132279 | 6/2010 |
| JP | 2017-052342 | 3/2017 |

\* cited by examiner

VEHICLE WHEEL DISC AND VEHICLE DISC WHEEL

This application is a national phase of PCT/JP2018/036174 filed on Sep. 28, 2018.

TECHNICAL FIELD

The present invention relates to a vehicle wheel disc and a disc wheel provided with the vehicle wheel disc.

BACKGROUND ART

In recent years, vehicles equipped with Electronic Stability Control (ESC) for stabilizing vehicle attitude during turning have become popular. In vehicles equipped with ESC, for example, when a driver causes a vehicle to make a sharp turn to urgently avoid an obstacle, the ESC operates so as to prevent skidding. At this point of operation, a large lateral force is generated in the wheel discs. Accordingly, wheel discs for use in a vehicle equipped with ESC are required to have higher rigidity than wheel discs for use in a conventional vehicle which are not equipped with ESC.

A technique for increasing rigidity of a vehicle wheel disc has been proposed.

For example, Patent Document 1 discloses a vehicle wheel disc having window forming portions. In the vehicle wheel disc of Patent Document 1, an outer side surface of the window forming portion in the radial direction of the disc is formed of a flat surface which is orthogonal to the radial direction of the disc. There is a description in Patent Document 1 that the above-mentioned configuration can prevent the window forming portion from being easily deformed when a force is applied to a rim from a tire of a vehicle.

LIST OF PRIOR ART DOCUMENTS

Patent Document

Patent Document 1: JP2017-52342A

SUMMARY OF INVENTION

Technical Problem

Only with the existing techniques, however, it is not sufficient to meet the demand for enhancing rigidity of a wheel disc. Accordingly, to ensure rigidity required for a wheel disc in a vehicle equipped with the ESC, it has been necessary to use a high strength material as a material for the wheel disc, or to increase the sheet thickness of the wheel disc. However, using a high, strength material poses a problem of increased manufacturing costs for the wheel disc, whereas increasing the sheet thickness of the wheel disc poses a problem of increased weight of the wheel disc.

In view of the above, an object of the present invention is to provide a vehicle wheel disc having high rigidity and a vehicle disc wheel provided with the vehicle wheel disc.

Solution to Problem

In general, a wheel disc is fixed to a hub of an axle in a vehicle. Specifically, bolts provided to the hub are inserted through bolt holes formed in the wheel disc and, thereafter, nuts are threadedly engaged with the bolts so that the wheel disc is fixed to the hub.

With respect to the wheel disc which is fixed to the hub as described above, the inventors of the present invention have made extensive studies in detail on a force which acts on the wheel disc from the axle, and a phenomenon which occurs in the wheel disc when the force is applied to the wheel disc. As a result, it is found that when a large force acts on the wheel disc from the axle, portions of the wheel disc which are fixed to the hub (more specifically, portions which are fastened by the nuts) are plastically deformed, thus increasing a possibility of occurrence of buckling on the wheel disc.

The present invention has been made based on the above-mentioned findings, and a vehicle wheel disc and a vehicle disc wheel described below are the gist of the present invention.

(1) A vehicle wheel disc to be mounted on a hub of an axle by a plurality of bolts provided to the hub and a plurality of nuts to be threadedly engaged with the plurality of bolts, the vehicle wheel disc including a mounting portion provided with a plurality of bolt holes through which the plurality of bolts are to be inserted, the mounting portion being adapted to be mounted on the hub by being fastened by the plurality of bolts inserted through the plurality of bolt holes and the plurality of nuts, wherein the mounting portion includes a flat plate portion having a pressing surface to be pressed against the hub, and a plurality of nut support portions protruding from the flat plate portion to a side opposite to the pressing surface in an axial direction of the vehicle wheel disc, and having an annular shape as viewed from the axial direction, each of the plurality of bolt holes penetrates the nut support portion in the axial direction, and each of the plurality of nut support portions includes a bulging portion curving to bulge outward in a radial direction of the nut support portion, and at least one protruding portion disposed adjacent to the bulging portion in a circumferential direction of the nut support portion, and protruding inward in the radial direction or outward in the radial direction of the nut support portion with respect to the bulging portion.

(2) The vehicle wheel disc according to the above-mentioned (1), wherein in a case where, as viewed from the axial direction, a straight line passing through a center of the vehicle wheel disc and a center of the bolt hole is assumed as a first imaginary line, and the nut support portion is divided into two regions by the first imaginary line, the protruding portion is provided to each of the two regions.

(3) The vehicle wheel disc according to the above-mentioned (1), wherein in a case where, as viewed from the axial direction, a straight line passing through a center of the vehicle wheel disc and a center of the bolt hole is assumed as a first imaginary line, a straight line passing through the center of the bolt hole and extending in a direction perpendicular to the first imaginary line is assumed as a second imaginary line, and the nut support portion is divided into two regions by the second imaginary line, the protruding portion is provided to each of the two regions.

(4) The vehicle wheel disc according to the above-mentioned (1), wherein in a case where, as viewed from the axial direction, a straight line passing through a center of the vehicle wheel disc and a center of the bolt hole is assumed as a first imaginary line, a straight line passing through the center of the bolt hole and extending in a direction perpendicular to the first imaginary line is assumed as a second imaginary line, and the nut support portion is divided into four regions by the first imaginary line and the second imaginary line, the protruding portion is provided to each of the four regions.

(5) A vehicle disc wheel including: a rim having a cylindrical shape; and the vehicle wheel disc according to any one of the above-mentioned (1) to (4) which is joined to the rim.

Advantageous Effects of Invention

According to the present invention, it is possible to obtain a vehicle wheel disc having high rigidity and a vehicle disc wheel provided with the vehicle wheel disc.

DESCRIPTION OF EMBODIMENTS

Hereinafter, a vehicle wheel disc and a vehicle disc wheel according to an embodiment of the present invention will be described with reference to drawings.
(Configuration of Vehicle Disc Wheel)

Figure 1:
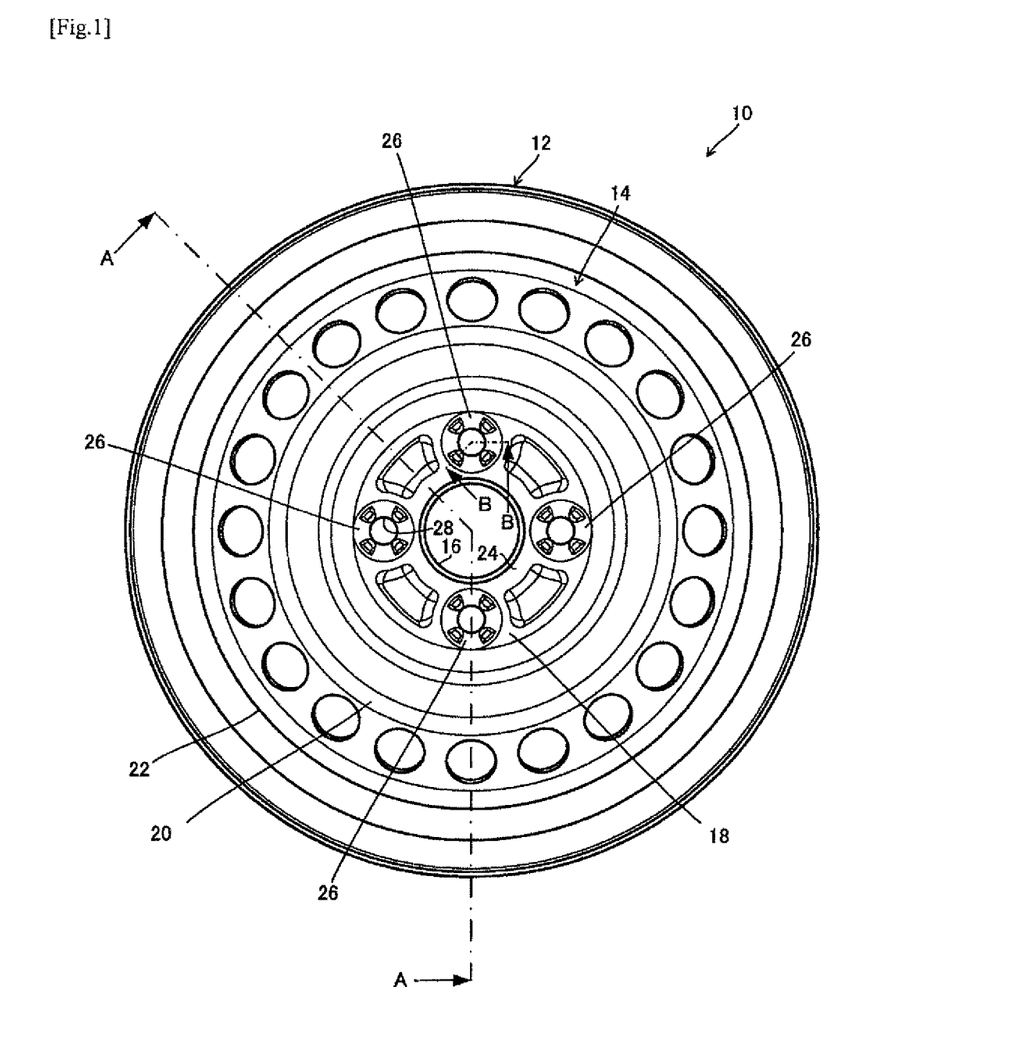
FIG. 1 is a plan view showing a vehicle disc wheel according to one embodiment of the present invention.
Figure 2:
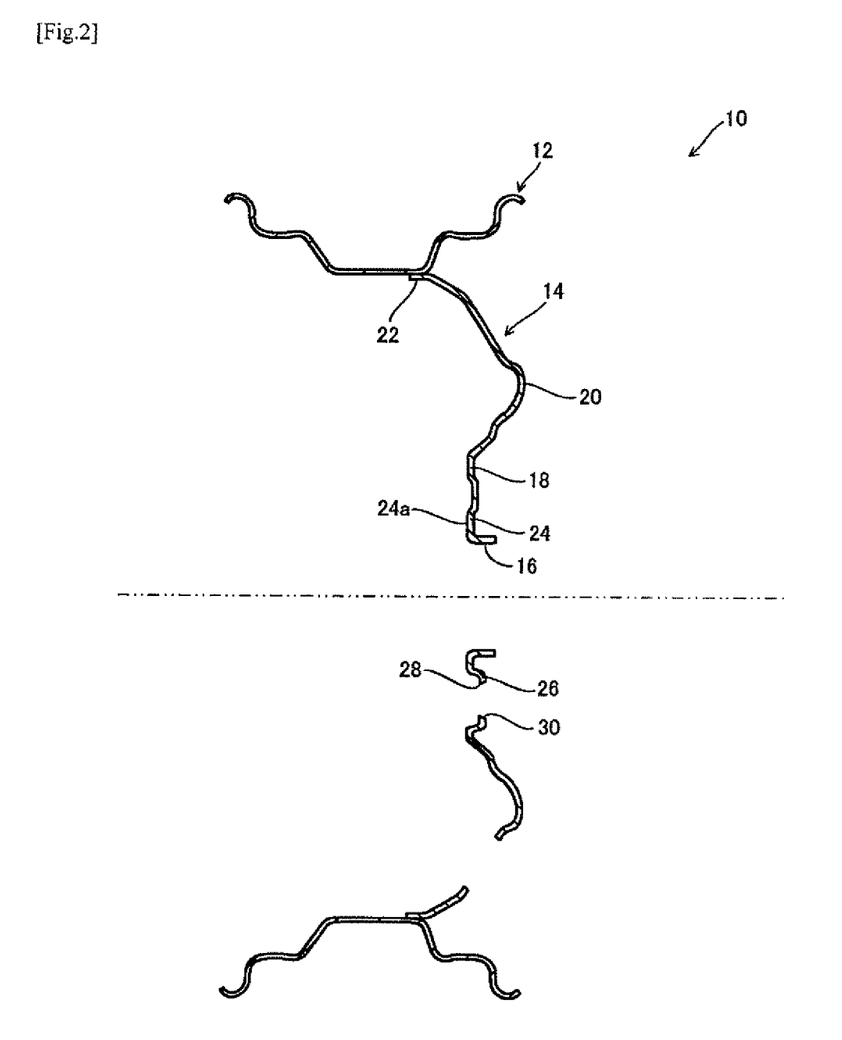
FIG. 2 is an end view taken along a line A-A in FIG. 1.

FIG. 1 is a plan view showing a vehicle disc wheel 10 (hereinafter, abbreviated as "wheel 10") according to one embodiment of the present invention, and FIG. 2 is a schematic end view of a portion which corresponds to a line A-A in FIG. 1. In FIG. 2, the axis of a vehicle wheel disc 14 described later is indicated by a two-dot chain line.

Referring to FIG. 1 and FIG. 2, the wheel 10 includes a rim 12 having a cylindrical shape, and the vehicle wheel disc 14 (hereinafter, abbreviated as "disc 14") according to one embodiment of the present invention. Various metal materials and resin materials may be used as materials for the rim 12 and the disc 14. Steel (hot-rolled steel sheet, for example), aluminum, an aluminum alloy or the like may be used as the metal material, for example.

The rim 12 and the disc 14 are welded in a state where the disc 14 is fitted in the rim 12, thus being joined with each other. Note that any of various known configurations of the rim can be adopted as the configuration of the rim 12 so that the detailed description will be omitted.

Although the detailed description will be omitted, in producing the disc 14, for example, first, a metal sheet obtained from a material coil is cut into a predetermined size. Thereafter, the metal sheet which is cut into the predetermined size is punched, thus obtaining a blank having a predetermined shape. Further, predetermined working, such as drawing and punching, is performed on the obtained blank, thus obtaining the disc 14.

The disc 14 has a substantially disc shape as a whole. A hub hole 16 is formed at the center portion of the disc 14. The hub hole 16 has a circular shape as viewed from the axial direction of the disc 14. The disc 14 includes a mounting portion 18, a hat portion 20 and a flange portion 22 which are provided in this order from the hub hole 16 toward the outside in the radial direction of the hub hole 16.

The mounting portion 18 is fastened by a plurality of bolts provided to a hub of an axle of a vehicle not shown in the drawing and a plurality of nuts to be threadedly engaged with the plurality of bolts, thus being mounted on the hub of the axle. The detail of the mounting portion 18 will be described later. Note that the mode of mounting the mounting portion 18 on the hub of the axle is substantially equal to the mode in a known wheel discs so that the detailed description will be omitted.

The hat portion 20 is formed to bulge from the mounting portion 18 in the axial direction of the disc 14. The flange portion 22 has a cylindrical shape, and is welded to the rim 12. Note that any of various known configurations of the hat portion and the flange portion can be adopted as the configurations of the hat portion 20 and the flange portion 22 so that the detailed description will be omitted.

Hereinafter, the mounting portion 18 will be described in detail.

The mounting portion 18 includes a flat plate portion 24 and a plurality of (four in this embodiment) nut support portions 26. Referring to FIG. 2, the flat plate portion 24 includes a pressing surface 24a. The pressing surface 24a is a surface which is pressed against the hub when the mounting portion 18 is mounted on the hub of the vehicle not shown in the drawing.

Referring to FIG. 1, the plurality of nut support portions 26 are arranged equidistantly in the circumferential direction of the disc 14. Each of the plurality of nut support portions 26 has an annular shape as viewed from the axial direction of the disc 14. Referring to FIG. 2, the nut support portion 26 protrudes from the flat plate portion 24 to the side opposite to the pressing surface 24a in the axial direction of the disc 14.

Figure 3:
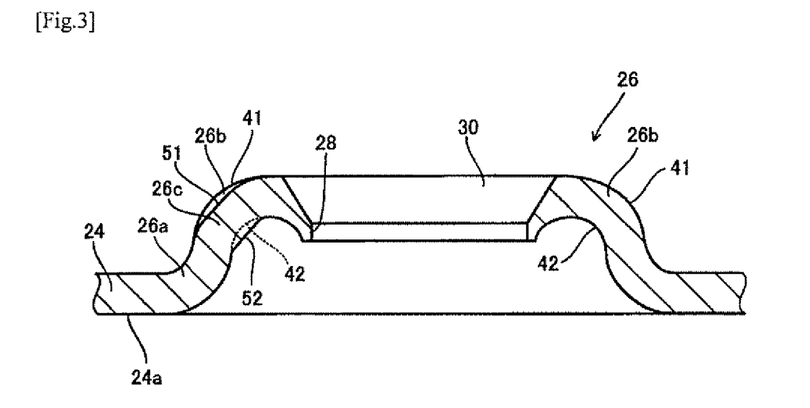
FIG. 3 is a schematic cross-sectional view of a nut support portion.
Figure 4:
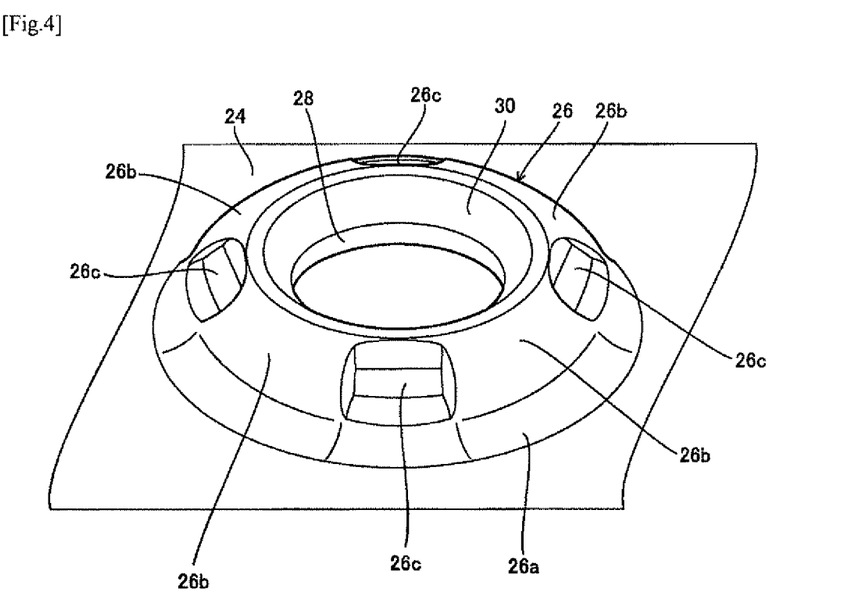
FIG. 4 is a schematic perspective view showing the nut support portion.

FIG. 3 is a schematic cross-sectional view of the nut support portion 26 (a portion which corresponds to a line B-B in FIG. 1), and FIG. 4 is a schematic perspective view showing the nut support portion 26.

Referring to FIG. 1 to FIG. 4, a bolt hole 28 through which the bolt is inserted is formed at the center portion of each nut support portion 26. The bolt hole 28 is formed to penetrate the nut support portion 26 in the axial direction of the disc 14. Referring to FIG. 3 and FIG. 4, a nut bearing surface 30 is formed at the center portion of the nut support portion 26 to communicate with the bolt hole 28. In this embodiment, the nut bearing surface 30 has a tapered shape. In this embodiment, the nut bearing surface 30 is formed such that the diameter of the nut bearing surface 30 increases as the distance from the pressing surface 24a increases in the axial direction of the disc 14.

In this embodiment, the plurality of bolts provided to the hub of the axle are inserted through the plurality of bolt holes 28 formed in the mounting portion 18, and the nuts are threadedly engaged with the respective bolts so that the disc 14 is mounted on the hub. The nut bearing surface 30 is a surface which supports the nut threadedly engaged with the bolt. Note that the shape of the nut bearing surface is not limited to the above-mentioned example, and any of various known shapes of the nut bearing surface may be adopted.

Referring to FIG. 3 and FIG. 4, each nut support portion 26 includes a raised portion 26a, a plurality of bulging portions 26b and a plurality of protruding portions 26c. The raised portion 26a is a portion which is raised from the flat plate portion 24 to the side opposite to the pressing surface 24a in the axial direction of the disc 14, and has an annular shape as viewed from the axial direction of the disc 14. The raised portion 26a curves to bulge inward in the radial direction of the nut support portion 26. In this embodiment, the raised portion 26a is formed to extend inward in the radial direction of the nut support portion 26, and to project in a direction approaching the pressing surface 24a in the axial direction of the disc 14.

The plurality of (four in this embodiment) bulging portions 26b and the plurality of (four in this embodiment) protruding portions 26c are respectively provided between the raised portion 26a and the nut bearing surface 30. In this embodiment, the plurality of bulging portions 26b and the plurality of protruding portions 26c are provided such that the bulging portion 26b and the protruding portion 26c are alternately arranged in the circumferential direction of the nut support portion 26.

Referring to FIG. 4, as viewed from the axial direction of the disc 14, each bulging portion 26b has an arc shape. Referring to FIG. 3 and FIG. 4, the bulging portion 26b curves to bulge outward in the radial direction of the nut support portion 26. In this embodiment, the bulging portion 26b is formed to extend outward in the radial direction of the nut support portion 26, and to project in a direction away from the pressing surface 24a in the axial direction of the disc 14.

The protruding portion 26c is disposed adjacent to the bulging portions 26b in the circumferential direction of the nut support portion 26. The protruding portion 26c protrudes inward in the radial direction of the nut support portion 26 with respect to the bulging portion 26b. In this embodiment, the protruding portion 26c extends inward in the radial direction of the nut support portion 26, and protrudes in a direction approaching the pressing surface 24a in the axial direction of the disc 14.

Referring to FIG. 3, in this embodiment, an outer surface 51 (a surface disposed outward in the radial direction of the nut support portion 26) of the protruding portion 26c is recessed toward the inside of the nut support portion 26 with respect to an outer surface 41 (a surface disposed outward in the radial direction of the nut support portion 26) of the bulging portion 26b. Further, an inner surface 52 (a surface disposed inward in the radial direction of the nut support portion 26) of the protruding portion 26c protrudes toward the inside of the nut support portion 26 with respect to an inner surface 42 (a surface disposed inward in the radial direction of the nut support portion 26) of the bulging portion 26b.

(Advantageous Effects of this Embodiment)

As has been described above, in the disc 14 according to this embodiment, the protruding portions 26c are provided to each nut support portion 26. The protruding portions 26c function as reinforcing ribs when a lateral force (a force in the axial direction of the disc 14) acts on the nut support portion 26. With such a configuration, even when a large force acts on the disc 14 from the axle, it is possible to suppress plastic deformation of the nut support portion 26. As a result, it is possible to suppress the occurrence of buckling on the disc 14. In other words, in the disc 14 according to this embodiment, rigidity of the disc 14 can be increased without changing a material from a material used for a conventional disc or changing a sheet thickness. Therefore, according to this embodiment, rigidity of the disc 14 can be increased while an increase in manufacturing costs for the disc 14 and an increase in weight are suppressed.

(Positions of Protruding Portions)

Figure 5A:
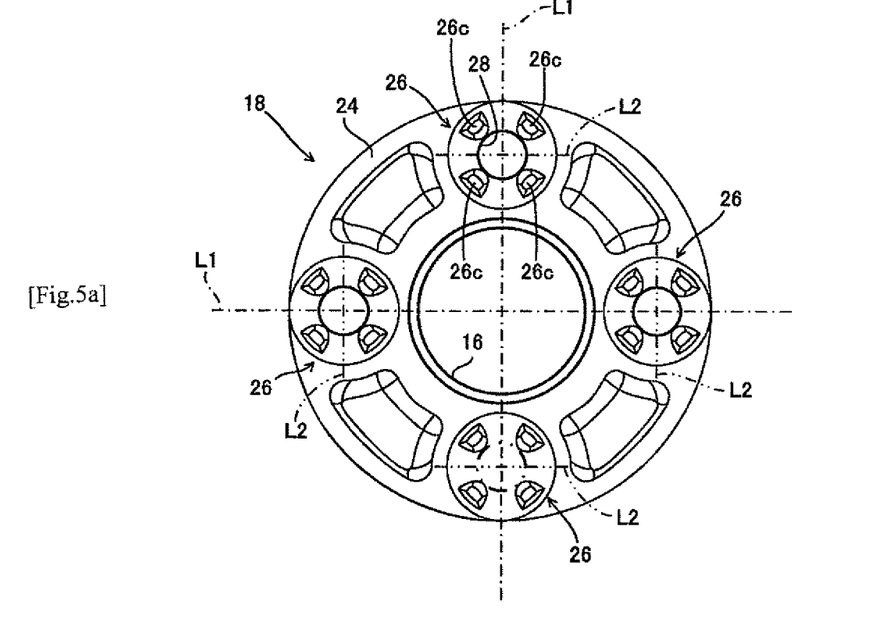
FIG. 5 is a view for describing positions where protruding portions are formed.
Figure 5B:
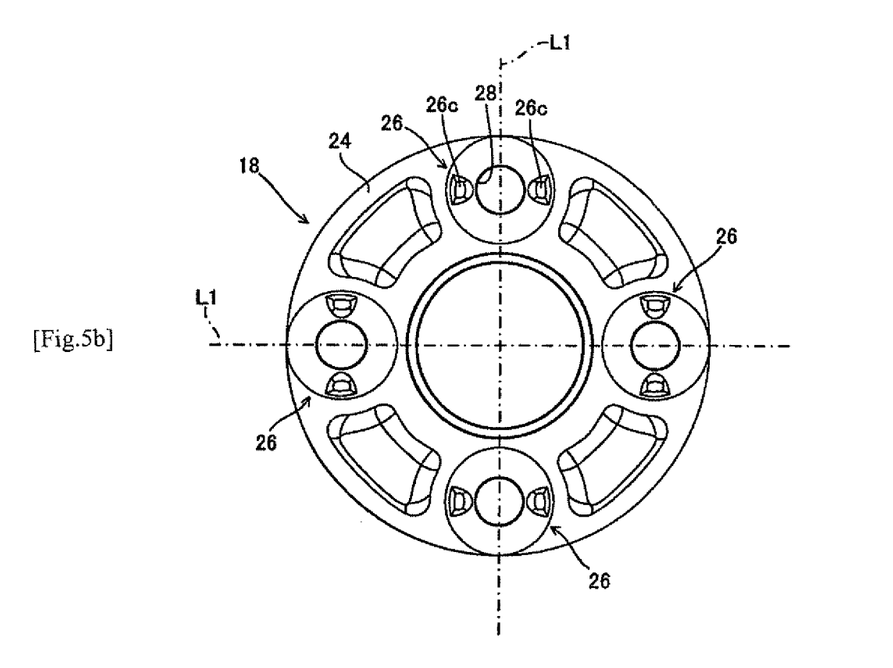
Figure 6A:
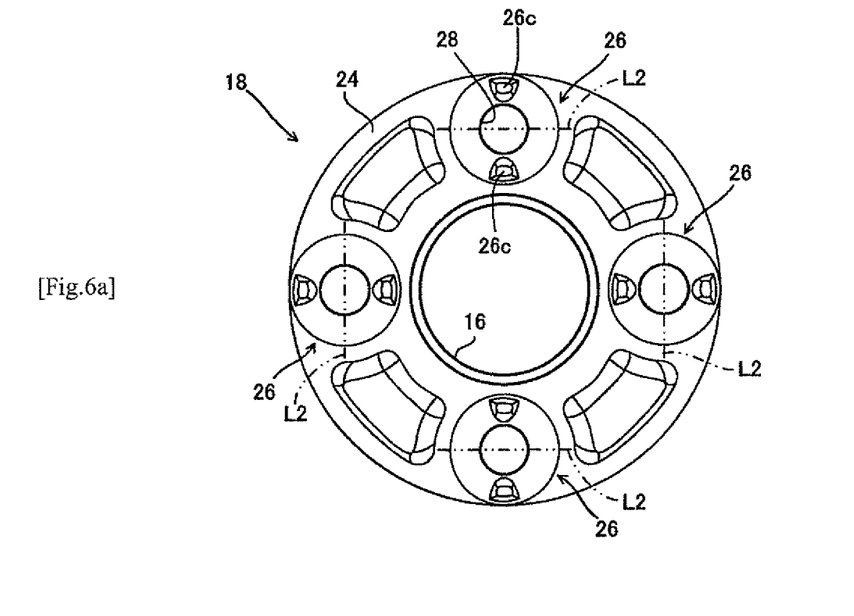
FIG. 6 is a view for describing positions where protruding portions are formed.
Figure 6B:
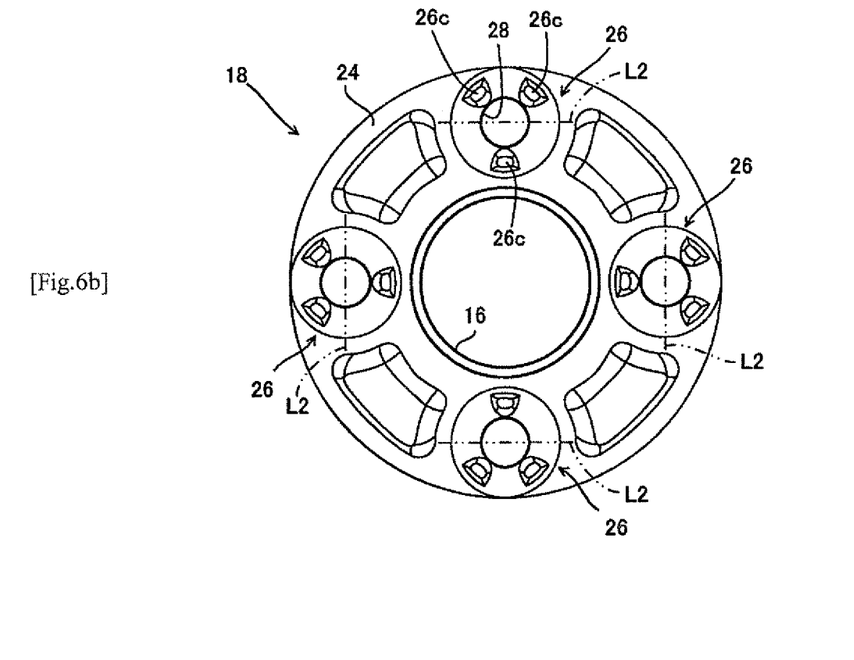

Hereinafter, positions where the protruding portions are formed in the nut support portion will be described. FIG. 5 and FIG. 6 are views for describing the positions where the protruding portions are formed. FIG. 5(a) is a view showing the mounting portion 18 in the above-mentioned embodiment, and FIG. 5(b), FIG. 6(a) and FIG. 6(b) are views showing modifications of the mounting portion 18. In FIG. 5, each imaginary straight line passing through the center of the disc 14 and the centers of the bolt holes 28 as viewed from the axial direction of the disc 14 is assumed as a first imaginary line L1, and is indicated by a chain line. Further, in FIG. 5 and FIG. 6, each imaginary straight line passing through the center of the bolt hole 28 and extending in a direction perpendicular to the first imaginary line L1 (see FIG. 5) as viewed from the axial direction of the disc 14 is assumed as a second imaginary line L2, and is indicated by a two-dot chain line. The first imaginary lines L1 are straight lines extending in a direction perpendicular to the axial direction of the disc 14. Note that, in FIG. 6, the first imaginary lines L1 are omitted in the drawing to prevent the drawing from becoming complicated.

Referring to FIG. 5(a), in the above-mentioned embodiment, in the case where the nut support portion 26 is divided into four regions by the first imaginary line L1 and the second imaginary line L2 as viewed from the axial direction of the disc 14, the protruding portion 26c is provided in each of the four regions. However, the positions where the protruding portions 26c are formed are not limited to the above-mentioned example. For example, in each nut support portion 26, two protruding portions 26c may be formed on the first imaginary line L1, and two protruding portions 26c may be formed on the second imaginary line L2. That is, the four protruding portions may be formed at positions displaced from the positions of the four protruding portions 26c shown in FIG. 5(a) by 45° in the circumferential direction of the nut support portion 26.

Further, for example, as shown in FIG. 5(b), in the case where the nut support portion 26 is divided into two regions by the first imaginary line L1 as viewed from the axial direction of the disc 14, the protruding portion 26c may be provided to each of the two regions. Positions where the protruding portions 26c are formed in the two regions are not particularly limited. For example, the protruding portion 26c in one region and the protruding portion 26c in the other region are disposed at positions line-symmetrical to each other with respect to the first imaginary line L1. Further, although the number of protruding portions 26c provided in each of the two regions is not particularly limited, for example, the same number of protruding portions 26c are provided to each of one region and the other region.

Further, for example, as shown in FIG. 6(a), in the case where the nut support portion 26 is divided into two regions by the second imaginary line L2 as viewed from the axial direction of the disc 14, the protruding portion may be provided to each of the two regions. The number of protruding portions 26c provided to each of the two regions is not particularly limited. However, for example, as shown in FIG. 6(b), of the two regions, the number of protruding portions 26c in the region disposed outward in the radial direction of the disc 14 may be larger than the number of protruding portions 26c in the region disposed inward in the radial direction of the disc 14. Alternatively, although not shown in the drawing, of the two regions, the number of protruding portions 26c in the region disposed inward in the radial direction of the disc 14 may be larger than the number of protruding portions 26e in the region disposed outward in the radial direction of the disc 14.

Further, the number of protruding portions 26c provided to each nut support portion 26 is not limited to the above-mentioned example. For example, the number of protruding portions 26c provided to each nut support portion 26 may be one or may be five or more. For example, in the mounting portion 18 shown in FIG. 6(a), one of the two protruding portions 26c provided to each nut support portion 26 may not be provided.

Further, in the above-mentioned embodiment, the case has been described where the protruding portion 26c protrudes inward in the radial direction of the nut support portion 26 with respect to the bulging portion 26b. However, the shape of the protruding portion is not limited to the above-mentioned example. For example, the protruding portion may protrude outward in the radial direction of the nut support portion 26 with respect to the bulging portion 26b. More specifically, for example, the protruding portion may extend outward in the radial direction of the nut support portion 26 with respect to the bulging portion 26b, and may protrude in a direction away from the pressing surface 24a in the axial direction of the disc 14. In this case, the nut support portion 26 is formed such that the outer surface of the protruding portion protrudes toward the outside of the nut support portion 26 with respect to the outer surface 41 of the bulging portion 26b (see FIG. 3), and the inner surface of the protruding portion is recessed toward the outside of the nut support portion 26 with respect to the inner surface 42 of the bulging portion 26b (see FIG. 3). Also in the case where the protruding portion is formed as described above, the substantially the same advantageous effects as the above-mentioned embodiment can be obtained.

In addition, each nut support portion 26 may be provided with the protruding portion which protrudes inward in the radial direction of the nut support portion 26 with respect to the bulging portion 26b and the protruding portion which protrudes outward in the radial direction of the nut support portion 26 with respect to the bulging portion 26b.

Although the detailed description will be omitted, it is preferable that the protruding portion be provided at a position in the vicinity of a portion of the pressing surface 24a to be firmly pressed against the hub when the mounting portion 18 is mounted on the hub of the axle.

INDUSTRIAL APPLICABILITY

As has been described above, according to the present invention, it is possible to obtain a vehicle wheel disc having high rigidity and a vehicle disc wheel provided with the vehicle wheel disc. Therefore, the present invention is preferably used for a disc wheel of the vehicle.

REFERENCE SIGNS LIST 10 vehicle disc wheel
12 rim
14 vehicle wheel disc
16 hub hole
18 mounting portion
20 hat portion
22 flange portion
24 flat plate portion
24a pressing surface
26 nut support portion
26a raised portion
26b bulging portion
26e protruding portion
28 bolt hole
30 nut bearing surface
41, 51 outer surface
42, 52 inner surface

The invention claimed is:

1. A vehicle wheel disc to be mounted on a hub of an axle by a plurality of bolts provided to the hub and a plurality of nuts to be threadedly engaged with the plurality of bolts,
the vehicle wheel disc comprising a mounting portion provided with a plurality of bolt holes through which the plurality of bolts are to be inserted, the mounting portion being adapted to be mounted on the hub by being fastened by the plurality of bolts inserted through the plurality of bolt holes and the plurality of nuts, wherein
the mounting portion includes a planar plate portion having a pressing surface to be pressed against the hub, and a plurality of nut support portions protruding from the planar plate portion to a side opposite to the pressing surface in an axial direction of the vehicle wheel disc, and having an annular shape as viewed from the axial direction,
each of the bolt holes penetrates each of the nut support portions in the axial direction,
each of the nut support portions includes a bulging portion curving to bulge outward in a radial direction of each of the nut support portions, at least one protruding portion disposed adjacent to the bulging portion in a circumferential direction of each of the nut support portions, and protruding in a thickness direction of the bulging portion of each of the nut support portions with respect to the bulging portion, and a nut bearing surface formed at a center portion of each of the nut support portions, and
the bulging portion and the at least one protruding portion are formed outside of the nut bearing surface in the radial direction of each of the nut support portions.

2. The vehicle wheel disc according to claim 1, wherein in a case where, as viewed from the axial direction, a straight line passing through a center of the vehicle wheel disc and a center of the bolt hole is assumed as a first imaginary line, and the nut support portion is divided into two regions by the first imaginary line, the protruding portion is provided to each of the two regions.

3. The vehicle wheel disc according to claim 1, wherein in a case where, as viewed from the axial direction, a straight line passing through a center of the vehicle wheel disc and a center of the bolt hole is assumed as a first imaginary line, a straight line passing through the center of the bolt hole and extending in a direction perpendicular to the first imaginary line is assumed as a second imaginary line, and the nut support portion is divided into two regions by the second imaginary line, the protruding portion is provided to each of the two regions.

4. The vehicle wheel disc according to claim 1, wherein in a case where, as viewed from the axial direction, a straight line passing through a center of the vehicle wheel disc and a center of the bolt hole is assumed as a first imaginary line, a straight line passing through the center of the bolt hole and extending in a direction perpendicular to the first imaginary line is assumed as a second imaginary line, and the nut support portion is divided into four regions by the first imaginary line and the second imaginary line, the protruding portion is provided to each of the four regions.

5. A vehicle disc wheel comprising:
a rim having a cylindrical shape; and
the vehicle wheel disc according to claim 1 which is joined to the rim.

6. A vehicle disc wheel comprising:
a rim having a cylindrical shape; and
the vehicle wheel disc according to claim 2 which is joined to the rim.

7. A vehicle disc wheel comprising:
a rim having a cylindrical shape; and
the vehicle wheel disc according to claim 3 which is joined to the rim.

8. A vehicle disc wheel comprising:
a rim having a cylindrical shape; and
the vehicle wheel disc according to claim 4 which is joined to the rim.

* * * * *